(12) United States Patent
Yamaguchi et al.

(10) Patent No.: US 8,492,467 B2
(45) Date of Patent: Jul. 23, 2013

(54) AUTOMOTIVE LAMP PERIPHERAL PARTS

(75) Inventors: Toru Yamaguchi, Tokyo (JP); Hiroshi Kamo, Tokyo (JP); Hiroshi Nishino, Tokyo (JP); Hiroyuki Shinryu, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/320,812

(22) PCT Filed: May 21, 2010

(86) PCT No.: PCT/JP2010/058664
§ 371 (c)(1),
(2), (4) Date: Nov. 16, 2011

(87) PCT Pub. No.: WO2010/134608
PCT Pub. Date: Nov. 25, 2010

(65) Prior Publication Data
US 2012/0071599 A1    Mar. 22, 2012

(30) Foreign Application Priority Data

May 22, 2009 (JP) ................................ 2009-123731
May 22, 2009 (JP) ................................ 2009-123734
Sep. 29, 2009 (JP) ................................ 2009-225247
Sep. 29, 2009 (JP) ................................ 2009-225253

(51) Int. Cl.
*C08L 71/12* (2006.01)
*C08K 3/34* (2006.01)

(52) U.S. Cl.
USPC .......................................... 524/166; 525/132

(58) Field of Classification Search
USPC .......................................... 524/166; 525/132
See application file for complete search history.

(56) References Cited

U.S. PATENT DOCUMENTS

| | | | |
|---|---|---|---|
| 4,681,906 A | 7/1987 | Abolins et al. | |
| 5,115,035 A | 5/1992 | Shiraki et al. | |
| 5,332,784 A * | 7/1994 | Shiraki et al. | 525/98 |
| 5,840,795 A | 11/1998 | Freeman et al. | |
| 5,871,846 A | 2/1999 | Freeman et al. | |
| 2004/0067374 A1 | 4/2004 | Borst et al. | |
| 2006/0241212 A1 | 10/2006 | Ozeki | |
| 2007/0259993 A1 | 11/2007 | Yamaguchi | |
| 2008/0051522 A1* | 2/2008 | Birsak et al. | 525/392 |
| 2010/0036029 A1 | 2/2010 | Yamaguchi et al. | |
| 2010/0240813 A1 | 9/2010 | Terada | |
| 2011/0166269 A1 | 7/2011 | Kondo et al. | |
| 2012/0071599 A1 | 3/2012 | Yamaguchi et al. | |

FOREIGN PATENT DOCUMENTS

| | | |
|---|---|---|
| EP | 0 770 637 | 5/1997 |
| JP | 48-40046 | 11/1973 |
| JP | 62-143967 | 6/1987 |
| JP | 63-99257 | 4/1988 |
| JP | 3-285949 | 12/1991 |
| JP | 5-320495 | 12/1993 |
| JP | 7-53865 | 2/1995 |
| JP | 07-316414 A | 12/1995 |
| JP | 08-113702 A | 5/1996 |
| JP | 9-167511 | 6/1997 |
| JP | 10-88028 | 4/1998 |
| JP | 11-60935 | 3/1999 |
| JP | 11-71477 | 3/1999 |
| JP | 11-119011 | 4/1999 |
| JP | 2002-069290 A | 3/2002 |
| JP | 2002-079540 | 3/2002 |
| JP | 2007-501956 | 2/2007 |
| JP | 2009-030045 A | 2/2009 |
| JP | 2009-123731 | 6/2009 |
| JP | 2009-221387 A | 10/2009 |
| JP | 2010-138216 A | 6/2010 |
| JP | 2010-180325 A | 8/2010 |
| WO | 2004/016692 | 2/2004 |
| WO | 2009/060917 | 5/2009 |
| WO | 2010/134608 A1 | 11/2010 |

OTHER PUBLICATIONS

Machine Translation of JP 11-119011. Apr. 1999.*
International Search Report for PCT/JP2010/058664, mailed Aug. 10, 2010.
International Preliminary Report on Patentability for PCT/JP2010/058664, mailed Dec. 22, 2011.

* cited by examiner

*Primary Examiner* — John Uselding
(74) *Attorney, Agent, or Firm* — Greenblum & Bernstein, P.L.C.

(57) ABSTRACT

There is provided automotive lamp peripheral parts excellent in heat resistance, rigidity and fogging property. The lamp peripheral part according to the invention is obtained from a resin composition containing 70% by mass or more of a polyphenylene ether (A) and a styrene-based resin (B), and has a haze value of a glass plate of 1.0% or less after the glass plate is subjected to a fogging test using an apparatus according to ISO 6452.

18 Claims, No Drawings

AUTOMOTIVE LAMP PERIPHERAL PARTS

TECHNICAL FIELD

The present invention relates to automotive lamp peripheral parts.

BACKGROUND ART

As materials used for automotive lamp peripheral parts, mainly thermosetting resins such as unsaturated polyester resin BMCs (bulk molding compounds) or aluminum have conventionally been used broadly. Although thermosetting resins such as unsaturated polyester resin BMCs are superior in the light weight to aluminum, since their specific gravities exceed 2.0, more weight reduction thereof is demanded. Thermosetting resins such as unsaturated polyester resin BMCs have also problems including the complexity of post-processing work of molded articles and the working environmental pollution due to dusts. Therefore, the conversion is progressing from thermosetting resins such as unsaturated polyester resin BMCs and aluminum toward thermoplastic resins such as polyphenylene ether, polyether imide and high heat-resistive polycarbonate as materials used for automotive lamp peripheral parts. In these applications, there are not a few cases where a high heat resistance, and a high rigidity and the surface smoothness of molded articles are required.

Polyphenylene ether resins have a variety of properties including being excellent in mechanical properties, electric properties, acid resistance, alkali resistance and heat resistance, and being low in water absorption and good in dimensional stability. Hence, polyphenylene ether resins are broadly used as materials for household appliances, OA devices, business machines, information equipment, automobiles and the like.

A usual method of improving heat resistance and rigidity of thermoplastic resins including polyphenylene ether resins is a method of adding inorganic fillers such as glass fibers, carbon fibers, mica and talc, but since the method remarkably damages the toughness, which the resins have intrinsically, and the surface appearance of molded articles, there are many applications in which the resins cannot be used.

There is now disclosed a technology regarding a reflecting plate for an automotive lamp, which is prepared by using a polyphenylene ether-based resin and which is excellent in heat resistance and hydrolysis resistance (for example, see Patent Document 1).

For a polyphenylene ether resin, there is disclosed a technology of imparting a high rigidity and holding a toughness intrinsic to the resin and a surface gloss (for example, see Patent Document 2). The technology is specifically one in which an inorganic filler surface treated with a silane compound and a thermoplastic elastomer modified with a specific functional group are added to a polyphenylene ether resin.

CITATION LIST

Patent Document

Patent Document 1: Japanese Patent Laid-Open No. 5-320495
Patent Document 2: WO 04/016692

SUMMARY OF INVENTION

Problems to be Solved by the Invention

Since automotive lamp peripheral parts are used under a high-temperature condition near a lamp (heat source), a problem that arises is the occurrence of fogging of a lens and the like by fogging gas components (outgas) emitted from resin materials constituting the parts.

Therefore, automotive lamp peripheral parts are required to have not only a high heat resistance, a high rigidity and a surface smoothness of molded articles, but also an excellent fogging property under a high-temperature condition.

However, with respect to the resin compositions disclosed in the technical documents described above, no study has been made on the fogging property under a high-temperature condition; so the resin compositions are not necessarily preferable as a material for automotive lamp peripheral parts in some cases.

Then, it is an object of the present invention to provide automotive lamp peripheral parts having high heat resistance, rigidity and surface smoothness, and further being excellent in the aluminum-deposition appearance and the fogging property under a high-temperature condition.

Means for Solving the Problems

The present inventors have exhaustively studied to solve the above-mentioned problems. As a result, it has been found that the use of a resin composition containing a polyphenylene ether in a specific ratio and having a specific fogging property can solve the above-mentioned problems, and this finding has led to the completion of the present invention.

That is, the present invention is as follows.

[1]
An automotive lamp peripheral part, being obtained from a resin composition comprising 70% by mass or more of a polyphenylene ether (A), and
having a haze value of a glass plate of 1.0% or less after the glass plate is subjected to a following fogging test using an apparatus according to ISO 6452:
<Fogging Test>
60 g of a pellet or a molded article obtained from the resin composition is put in a glass-made sample bottle; the sample bottle is covered with a glass plate as a lid, and heated at 170° C. for 24 hours to thereby generate fogging on the glass plate.

[2]
The automotive lamp peripheral part according to [1], wherein the resin composition further comprises 30% by mass or less of a styrene-based resin (B).

[3]
The automotive lamp peripheral part according to [2], wherein the styrene-based resin (B) is a styrene-based resin reinforced with no rubber.

[4]
The automotive lamp peripheral part according to [2] or [3], wherein the styrene-based resin (B) comprises a styrene-acrylonitrile resin comprising 5 to 15% by mass of acrylonitrile.

[5]
The automotive lamp peripheral part according to any one of [2] to [4], wherein 40% by mass or more in 100% by mass of the styrene-based resin (B) is a styrene-acrylonitrile resin comprising 5 to 15% by mass of acrylonitrile.

[6]
The automotive lamp peripheral part according to any one of [1] to [5], wherein the resin composition further comprises 0.1 to 10% by mass of a styrene-based thermoplastic elastomer (C).

[7]
The automotive lamp peripheral part according to [6], wherein the styrene-based thermoplastic elastomer (C) is a styrene-based thermoplastic elastomer functionalized with a compound having an amino group.

[8]
The automotive lamp peripheral part according to any one of [1] to [7], wherein the resin composition further comprises 0.1 to 7% by mass of an alkanesulfonic acid metal salt (D).

[9]
The automotive lamp peripheral part according to any one of [1] to [8], wherein the resin composition further comprises 5 to 25% by mass of a kaolin clay (E); and
the kaolin clay (E) has an average primary particle diameter of 0.01 to 1.0 μm.

[10]
The automotive lamp peripheral part according to [9], wherein the kaolin clay (E) has an average primary particle diameter of 0.01 to 0.5 μm.

[11]
The automotive lamp peripheral part according to [9] or [10], wherein the proportion of the number of agglomerated particles of the kaolin clay (E) having a particle diameter of 2 μm or more accounts for less than 1%.

[12]
The automotive lamp peripheral part according to any one of [9] to [11], wherein the kaolin clay (E) is a waterwashed kaolin clay.

[13]
The automotive lamp peripheral part according to any one of [9] to [12], wherein the kaolin clay (E) is a kaolin clay dried by using a drier.

[14]
The automotive lamp peripheral part according to any one of [9] to [13], wherein the kaolin clay (E) is a kaolin clay dried by using a vacuum drier heated at an interior temperature thereof of 150 to 200° C.

[15]
The automotive lamp peripheral part according to any one of [9] to [14], wherein the kaolin clay (E) has a residual volatile content (a weight loss proportion after drying at 200° C. for 3 hours by a vacuum drier) of 0.5% by mass or less.

[16]
The automotive lamp peripheral part according to any one of [9] to [15], wherein the kaolin clay (E) is a kaolin clay surface treated with a silane compound.

[17]
The automotive lamp peripheral part according to any one of [9] to [16], wherein the kaolin clay (E) is a kaolin clay surface treated with a sulfur-based silane compound.

[18]
The automotive lamp peripheral part according to any one of [1] to [17], wherein the polyphenylene ether (A) has a reduced viscosity (measured at 30° C. using a chloroform solvent) of 0.25 to 0.43 dL/g.

[19]
The automotive lamp peripheral part according to any one of [1] to [18], wherein an aluminum-deposited specular portion has a total reflectance of 85% or more; and the aluminum-deposited specular portion has a diffusion reflectance of 3.0% or less.

[20]
The automotive lamp peripheral part according to [1] to [19], wherein the automotive lamp peripheral part is one selected from the group consisting of automotive lamp lens holders, automotive lamp extensions and automotive lamp reflectors.

Advantages of the Invention

The present invention can provide automotive lamp peripheral parts having high heat resistance, rigidity and surface smoothness, and further being excellent in the aluminum-deposition appearance and the fogging property under a high-temperature condition.

MODE FOR CARRYING OUT THE INVENTION

Hereinafter, a mode for carrying out the present invention (hereinafter, referred to as "present embodiment") will be described in detail. The present invention is not limited to the following embodiment, and may be carried out by being changed and modified variously within the gist.

<<Automotive Lamp Peripheral Part>>

The automotive lamp peripheral part according to the present embodiment is obtained from a resin composition comprising 70% by mass or more of a polyphenylene ether (A), and has a haze value of a glass plate of 1.0% or less after the glass plate is subjected to the following fogging test using an apparatus according to ISO 6452. The haze value of the glass plate is preferably 0.8% or less, and more preferably 0.5% or less.

<Fogging Test>

60 g of a pellet or a molded article obtained from the resin composition described above is put in a glass-made sample bottle; the sample bottle is covered with a glass plate as a lid, and heated at 170° C. for 24 hours to thereby generate fogging on the glass plate.

If the haze value of the glass plate is in the range described above, an automotive lamp peripheral part excellent in the fogging property can be obtained. As a result, the function of a lamp can be held for a long period.

In the present embodiment, the fogging property refers to a property that the fogging is caused on portions to which gas components (outgas) emitted when a resin composition is heated are adhered. A smaller haze value of a glass plate after being subjected to the fogging test described above means a better fogging property.

Use of a resin composition containing a polyphenylene ether (A) in a specific ratio and having a specific fogging property can provide an automotive lamp peripheral part having high heat resistance and rigidity and further being excellent in the fogging property under a high-temperature condition.

A molding method in the case of manufacturing the automotive lamp peripheral part by using the resin composition is not limited to the following, but suitably includes, for example, injection molding, extrusion, vacuum molding and compression molding.

In the present embodiment, automotive lamp peripheral parts mean parts used near a lamp (heat source) under a high-temperature condition, and include, for example, automotive lamp lens holders, automotive lamp extensions and automotive lamp reflectors.

The automotive lamp peripheral part according to the present embodiment is especially preferably one selected from the group consisting of automotive lamp lens holders, automotive lamp extensions and automotive lamp reflectors, from the viewpoint of being excellent in surface smoothness, hot rigidity and heat resistance and excellent in the fogging property at high temperatures.

Here, an automotive lamp lens holder refers to a cylindrical member to unify a reflector as a light reflecting part present behind a light source beam of an automotive lamp and a convex lens present ahead thereof. The automotive lamp lens holder needs particularly to have the fogging property, and a high heat resistance and a high hot rigidity.

An automotive lamp extension refers to a relatively large-sized light reflecting part present between the reflector and a lamp front cover, and although it does not need to have as high a heat resistance as needed for the reflector and the lens holder, it needs particularly to have the fogging property, the aluminum-deposition appearance, the heat resistance, the molding flowability, and a low specific gravity.

The automotive lamp reflector is a light reflecting part nearest the light source beam, and needs particularly to have the fogging property, a high heat resistance, a high hot rigidity, and the aluminum-deposition appearance.

In the automotive lamp peripheral part according to the present embodiment, a total reflectance of an aluminum-deposited specular portion is preferably 85% or more, more preferably 88% or more, and still more preferably 90% or more, from the viewpoint of a sufficient light reflection. A diffusion reflectance of the aluminum-deposited specular portion is preferably 3.0% or less, more preferably 2.0% or less, and still more preferably 1.0% or less, from the viewpoint of the sufficient light reflection.

In the present embodiment, the total reflectance and the diffusion reflectance are values measured by methods described in Examples described later.

Hereinafter, each constituting component of resin compositions used in the present embodiment will be described in detail.

<Polyphenylene Ether (A)>

A polyphenylene ether (A) used in the present embodiment is preferably a homopolymer or a copolymer having a repeating unit represented by the following formula (1) (the following general formulae (1)[a] and (1)[b] are collectively referred to as "the formula (1)"), and the repeating unit composed of the general formula (1)[a] or the general formula (1)[b].

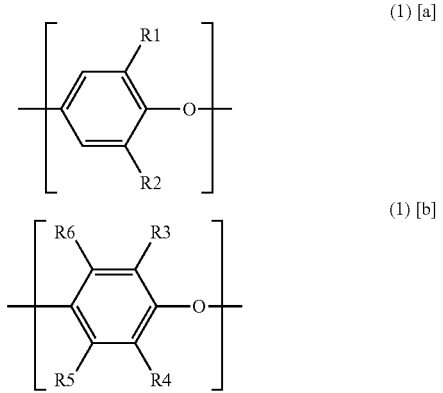

In the above formula, R1, R2, R3, R4, R5 and R6 are each independently preferably a monovalent residue of an alkyl group having 1 to 4 carbon atoms, an aryl group having 6 to 12 carbon atoms, a halogen, hydrogen, or the like. Provided that the case where R5 and R6 are hydrogen simultaneously is excluded. A more preferable number of carbon atoms of the alkyl group is 1 to 3, and that of the aryl group is 6 to 8; and among the monovalent residues, a more preferable one is hydrogen. The numbers of the repeating units in the above formula (1)[a] and the above formula (1)[b] are not especially limited since those vary depending on the molecular distribution of the polyphenylene ether (A).

Examples of the homopolymer of the polyphenylene ether (A) may include, but are not limited to, poly(2,6-dimethyl-1,4-phenylene)ether, poly(2-methyl-6-ethyl-1,4-phenylene) ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene) ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether and poly(2-methyl-6-chloroethyl-1,4-phenylene)ether. Above all, poly(2,6-dimethyl-1,4-phenylene)ether is preferable from the viewpoint of the easiness of availability of the raw materials, and the processability.

Examples of the copolymer of the polyphenylene ether (A) may include, but are not limited to, ones having a polyphenylene ether structure as a main structure, such as copolymers of 2,6-dimethylphenol and 2,3,6-trimethylphenol, copolymers of 2,6-dimethylphenol and o-cresol, and copolymers of 2,3,6-trimethylphenol and o-cresol. Above all, copolymers of 2,6-dimethylphenol and 2,3,6-trimethylphenol are preferable from the viewpoint of the easiness of availability of the raw materials, and the processability; and a copolymer of 90 to 70% by mass of 2,6-dimethylphenol and 10 to 30% by mass of 2,3,6-trimethylphenol is more preferable from the viewpoint of improving physical properties.

A polyphenylene ether (A) may contain other various types of phenylene ether units as partial structures within the limits not departing from the desired advantage for the present embodiment. Examples of a phenylene ether unit may include, but are not limited to, a 2-(dialkylaminomethyl)-6-methylphenylene ether unit and a 2-(N-alkyl-N-phenylaminomethyl)-6-methylphenylene ether unit, described in Japanese Patent Laid-Open Nos. 01-297428 and 63-301222.

A small amount of diphenoquinone and the like may further be bonded in the main chain of the polyphenylene ether. A polyphenylene ether may still further be converted to a functionalized polyphenylene ether by reacting (modifying) a part or the whole of the polyphenylene ether with an acyl functional group and a functionalizing agent containing one or more selected from the group consisting of carboxylic acids, acid anhydrides, acid amides, imides, amines, orthoesters, and hydroxy and carboxylic acid ammonium salts.

In the resin composition used in the present embodiment, a content of the polyphenylene ether (A) is 70% by mass or more, preferably 75 to 95% by mass or more, and more preferably 80 to 90% by mass or more. Making the content of the polyphenylene ether (A) in the range described above can provide an automotive lamp peripheral part having high heat resistance, rigidity and surface smoothness, and further being excellent in the aluminum-deposition appearance and the fogging property under a high-temperature condition.

A reduced viscosity of the polyphenylene ether (A) is in the range of preferably 0.25 to 0.55 dl/g, more preferably 0.25 to 0.50 dl/g, especially preferably 0.25 to 0.43 dl/g, and further especially preferably 0.25 to 0.35 dL/g. The reduced viscosity is preferably 0.25 dl/g or higher from the viewpoint of sufficient mechanical properties, and is preferably 0.55 dl/g or lower from the viewpoint of the molding processability. In the present embodiment, the reduced viscosity refers to a value acquired from a measurement using a chloroform solvent at 30° C.

The residual volatile content of the polyphenylene ether (A) is preferably 0.6% by mass or less from the viewpoint of improving the surface appearance of an automotive lamp peripheral part. A more preferable content thereof is 0.4% by mass or less. Here, the polyphenylene ether (A) whose residual volatile content is 0.6% by mass or less is not limited to the following, but can be suitably manufactured, for example, by regulating the drying temperature and the drying time after the polymerization of the polyphenylene ether. The drying temperature includes 40 to 200° C., and is preferably 80 to 180° C., and more preferably 120 to 170° C. The drying time includes 0.5 to 72 hours, and is preferably 2 to 48 hours, and more preferably 6 to 24 hours. In order to remove the residual volatile content of a polyphenylene ether (A) in a relatively short time, the drying needs to be carried out at a high temperature. In such a case, in order to prevent the deterioration due to heat, drying in a nitrogen atmosphere or drying in a vacuum drier is suitable. In the present embodiment, the residual volatile content is indicated as a proportion of a lost mass after drying for 3 hours in a vacuum drier at 200° C. (a proportion of a lost mass to an original mass).

In order to reduce the residual volatile content of the polyphenylene ether (A) and make the residual volatile content in the range described above by the drying after the polymerization, the polymerization is preferably carried out by previously using a polymerization solvent not adversely affecting the polymerization, almost not adversely affecting the environment, and having a relatively low boiling point to be easily volatilized. Examples of the polymerization solvent may include, but are not limited to, toluene. Describing more specifically, after a polyphenylene ether whose reduced viscosity is in the range described above has been polymerized by a well-known polymerization method, by fully drying the obtained polymer using a vacuum drier or the like, a polyphenylene ether whose residual volatile content is in the range described above can be manufactured. Alternatively, even if a polymerization solvent other than a preferable one described above is used, by carrying out the drying fully, a polyphenylene ether whose residual volatile content is in the range described above can be manufactured.

<Styrene-Based Resin (B)>

The resin composition used in the present embodiment preferably contains 30% by mass or less of a styrene-based resin (B) from the viewpoint of improving the molding processability. The content of the styrene-based resin (B) in the resin composition is more preferably 1 to 25% by mass, and still more preferably 4 to 20% by mass.

The content of the styrene-based resin (B) in the range described above is likely to improve the melt flowability of the resin composition without damaging the rigidity and the heat resistance of an automotive lamp peripheral part to the best and without reducing the fogging property under a high-temperature condition.

The styrene-based resin (B) used in the present embodiment is preferably a styrene-based resin reinforced with no rubber.

Here, the styrene-based resin reinforced with no rubber refers to a synthetic resin obtained by polymerizing a styrene-based compound or a styrene-based compound and a compound copolymerizable with the styrene-based compound in the absence of a rubbery polymer, and means a compound represented by the following formula (2).

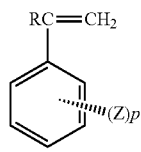

(2)

In the above formula, R is hydrogen, a lower alkyl group or a halogen; Z is one or more selected from the group consisting of a vinyl group, hydrogen, a halogen and a lower alkyl group; and p is an integer of 0 to 5. In the above formula, the substituent(s) other than Z in the phenyl group is hydrogen.

Specific examples represented by the above formula (2) may include, but are not limited to, styrene, α-methylstyrene, 2,4-dimethylstyrene, monochlorostyrene, p-methylstyrene, p-tert-butylstyrene and ethylstyrene.

The compound copolymerizable with the styrene-based compound includes methacrylate esters such as methyl methacrylate and ethyl methacrylate; unsaturated nitrile compounds such as acrylonitrile and methacrylonitrile; and acid anhydrides such as maleic anhydride, and is used together with the styrene-based compound.

A particularly preferable styrene-based resin reinforced with no rubber is a styrene-based resin containing a styrene-acrylonitrile resin containing 5 to 15% by mass of an acrylonitrile component.

The content of acrylonitrile in the styrene-acrylonitrile resin is preferably 5 to 15% by mass, more preferably 5 to 12% by mass, and still more preferably 7 to 10% by mass, from the viewpoint of improving the surface appearance of an obtained automotive lamp peripheral part and securing sufficient miscibility with the polyphenylene ether (A).

40% by mass or more of the styrene-acrylonitrile resin containing 5 to 15% by mass of acrylonitrile is preferably contained in 100% by mass of a styrene-based resin (B) from the viewpoint of improving a balance between the molding flowability and the heat resistance and improving the fogging property and the aluminum-deposition appearance of the molded article. The proportion of the styrene-acrylonitrile resin in the styrene-based resin (B) is more preferably 40 to 70% by mass, still more preferably 45 to 65% by mass, and especially preferably 45 to 60% by mass.

<Styrene-Based Thermoplastic Elastomer (C)>

The resin composition used in the present embodiment preferably contains 0.1 to 10% by mass of a styrene-based thermoplastic elastomer (C) from the viewpoint of imparting the impact resistance and further improving the fogging property.

The styrene-based thermoplastic elastomer (C) refers to a block copolymer having a polystyrene block and a rubber intermediate block. Examples of the rubber intermediate block may include, but are not limited to, polybutadiene, polyisoprene, poly(ethylene.butylene), poly(ethylene.propylene) and vinyl-polyisoprene. The rubber intermediate block may be used singly or in combination of two or more.

An arrangement mode of the repeating units constituting the block copolymer may be of a linear type or of a radial type. A block structure constituted of the polystyrene block and the rubber intermediate block may be any of two-block type, three-block type and four-block type. Above all, the block copolymer is preferably a block copolymer of a three-block linear type constituted of a polystyrene-poly(ethylene.butylene)-polystyrene structure from the viewpoint of being capable of sufficiently exhibiting the desired advantage for the present embodiment. The rubber intermediate block may contain a butadiene unit in a range not exceeding 30% by mass.

In the resin composition used in the present embodiment, as the styrene-based thermoplastic elastomer (C), use of a styrene-based thermoplastic elastomer functionalized by introduction of a functional group such as a carbonyl group and an amino group is preferable from the viewpoint of improving the surface appearance of an automotive lamp peripheral part. Particularly in the resin composition used in the present embodiment, as the styrene-based thermoplastic elastomer (C), use of a styrene-based thermoplastic elastomer functionalized by a compound having an amino group (hereinafter, also described as "functionalized styrene-based thermoplastic elastomer") is more preferable.

The carbonyl group is introduced to the styrene-based thermoplastic elastomer (C) by modifying with an unsaturated carboxylic acid or a functional derivative thereof. Examples of the unsaturated carboxylic acid or the functional derivative thereof may include, but are not limited to, maleic acid, fumaric acid, itaconic acid, halogenated maleic acid, cis-4-cyclohexene-1,2-dicarboxylic acid and endo-cis-bicyclo[2,2,1]-5-heptene-2,3-dicarboxylic acid, and anhydrides, ester compounds, amido compounds and imide compounds of these dicarboxylic acids, and further acrylic acid and methacrylic acid and ester compounds and amide compounds of these monocarboxylic acids. Above all, preferable is maleic anhydride from the viewpoint of holding the surface appearance of an automotive lamp peripheral part and imparting the impact resistance.

The amino group is introduced by reacting an imidazolidinone compound, a pyrrolidone compound or the like with the styrene-based thermoplastic elastomer (C).

In the resin composition used in the present embodiment, the content of the styrene-based thermoplastic elastomer (C) is 0.1 to 10% by mass, preferably 0.5 to 8% by mass, more preferably 1 to 6% by mass, and still more preferably 2 to 5% by mass. The content is preferably 0.1% by mass or more from the viewpoint of imparting the impact resistance and improving the fogging property, and is preferably 10% by mass or less from the viewpoint of holding the rigidity.

<Alkanesulfonic Acid Metal Salt (D)>

The resin composition used in the present embodiment preferably contains 0.1 to 7% by mass of an alkanesulfonic acid metal salt (D) from the viewpoint of imparting the molding flowability, imparting the heat resistance and the impact resistance to an automotive lamp peripheral part, and improving the aluminum-deposition appearance of the automotive lamp peripheral part.

The alkanesulfonic acid metal salt (D) refers to a compound represented by the chemical formula: R—SO$_3$X (R: an alkyl group or an aryl group, X: an alkali metal or an alkaline earth metal). Among such alkanesulfonic acid metal salts, an alkanesulfonic acid metal salt having 8 to 20 carbon atoms is preferable; that having 12 to 20 carbon atoms is more preferable; and that having 12 to 16 carbon atoms is especially preferable. An alkanesulfonic acid metal salt having 8 or more carbon atoms is preferable from the viewpoint of the heat resistance, mechanical properties such as the impact resistance, and holding the fogging property of the automotive lamp peripheral part; and an alkanesulfonic acid metal salt having 24 or less carbon atoms is preferable from the viewpoint of processability such as extrusion and molding.

The alkanesulfonic acid metal salt (D) is preferably a sodium alkanesulfonate. Specific examples of the sodium alkanesulfonate may include sodium dodecanesulfonate, sodium tetradecanesulfonate, sodium hexadecanesulfonate, sodium octadecanesulfonate, sodium decylbenzenesulfonate, sodium dodecylbenzenesulfonate and sodium tetradecylbenzenesulfonate. Above all, especially preferable are sodium alkanebenzenesulfonates such as sodium decylbenzenesulfonate, sodium dodecylbenzenesulfonate and sodium tetradecylbenzenesulfonate. These sodium alkanesulfonates may be used singly or as a mixture of two or more.

Any of properties of the alkanesulfonic acid metal salt (D), such as being liquid, powdery, granular, flaky and particulate (pellet-shaped), can be used. Being particulate (pellet-shaped) is preferable from the viewpoint of the prevention of moisture absorption and the handleability.

In the resin composition used in the present embodiment, the content of the alkanesulfonic acid metal salt (D) is 0.1 to 7% by mass, preferably 0.5 to 5% by mass, and more preferably 1 to 3% by mass. The content is preferably 0.1% by mass or more from the viewpoint of imparting the molding flowability to the resin composition, imparting the heat resistance and impact resistance to an automotive lamp peripheral part, and improving the aluminum-deposition appearance of the automotive lamp peripheral part; and the content is preferably 7% by mass or less from the viewpoint of holding the fogging property of the automotive lamp peripheral part.

<Kaolin Clay (E)>

The resin composition used in the present embodiment preferably contains 5 to 25% by mass of a kaolin clay (E) having an average primary particle diameter of 0.01 to 1 μm from the viewpoint of imparting the heat resistance and the hot rigidity to an automotive lamp peripheral part and improving the fogging property thereof without reducing the appearance of the automotive lamp peripheral part.

The average primary particle diameter of the kaolin clay (E) is preferably in the range of 0.01 to 0.5 μm, more preferably 0.05 to 0.5 μm, and still more preferably 0.05 to 0.3 μm. In the resin composition used in the present embodiment, the average primary particle diameter of the kaolin clay (E) is preferably 0.01 μm or larger from the viewpoint of improving the rigidity; and the diameter is preferably 1 μm or smaller from the viewpoint of holding the gloss and the surface smoothness of an automotive lamp peripheral part. In the present embodiment, the average primary particle diameter is a value acquired by measurement by a laser light diffraction method.

In the resin composition used in the present embodiment, the kaolin clay (E) can be blended as it is, but is preferably used with the residual volatile content made 1.0% by mass or less, more preferably 0.5% by mass or less, and still more preferably 0.3% by mass or less, from the viewpoint of the handleability and improving the flame retardance of the resin composition.

The residual volatile content of the kaolin clay (E) as a product is usually 1.3 to 1.5% by mass, but can be reduced by being dried in a drier. In the case of reducing the residual volatile content by using a drier, the drying is preferably carried out by using a vacuum drier from the viewpoint of the drying efficiency. The drying temperature is preferably in the range of 80 to 220° C., more preferably in the range of 120 to 200° C., and especially preferably in the range of 150 to 180° C. The drying at 80° C. or higher is preferable from the viewpoint of the drying efficiency; and the drying at 220° C. or lower is preferable from the viewpoint of holding the quality of the kaolin clay. The drying time is preferably in the range of 0.5 to 24 hours, more preferably in the range of 1 to 12 hours, still more preferably in the range of 1 to 8 hours, and especially preferably in the range of 2 to 6 hours. The drying time is preferably 0.5 hour or longer from the viewpoint of sufficient drying; and the drying time is preferably 24 hours or shorter from the viewpoint of sufficiently holding the quality.

When the kaolin clay (E) is taken out from the drier, the kaolin clay (E) is preferably taken out at a temperature of 100° C. or lower. The temperature is more preferably 70° C. or lower, and still more preferably 50° C. or lower. The taking-out is preferably carried out at 100° C. or lower from the viewpoint of sufficiently holding the quality of the kaolin clay.

The kaolin clay (E) is preferably a kaolin clay dried using a drier, and more preferably a kaolin clay dried using a vacuum drier whose interior is heated at 150 to 200° C.

In the present embodiment, the value of the residual volatile content of the kaolin clay (E) is indicated as a proportion of a lost mass after the kaolin clay (E) is dried for 3 hours in a vacuum drier at 200° C. based on an original mass.

In the resin composition used in the present embodiment, the kaolin clay (E) is preferably a kaolin clay surface treated with a silane compound from the viewpoint of holding the surface appearance of an automotive lamp peripheral part.

The silane compound used for the surface treatment of the kaolin clay (E) is one usually used in order to surface treat glass fillers, mineral fillers and the like.

Specific examples of the silane compound may include, but are not limited to, vinylsilane compounds such as vinyltrichlorosilane, vinyltriethoxysilane and γ-methacryloxypropyltrimethoxysilane; epoxysilane compounds such as γ-glycidoxypropyltrimethoxysilane; sulfur-based silane compounds such as bis-(3-triethoxysilylpropyl)tetrasulfide and γ-mercaptopropyltrimethoxysilane; and aminosilane compounds such as γ-aminopropyltriethoxysilane and N-phenyl-γ-aminopropyltrimethoxysilane. The silane compounds may be used singly or in combination of two or more. Preferable silane compounds are sulfur-based silane compounds, and more preferable silane compounds are mercaptosilane compounds, from the viewpoint of the easiness of handleability as powder, and being capable of sufficiently holding the flame retardancy being a desired advantage for the present embodiment.

In the resin composition used in the present embodiment, the kaolin clay (E) is preferably a waterwashed kaolin clay from the viewpoint of holding the surface smoothness of an automotive lamp peripheral part, improving the rigidity and toughness thereof, and improving the fogging property thereof.

The waterwashed kaolin clay refers to one obtained by using a method (waterwashing method) in which the separation purification of a kaolin clay having a desired average primary particle diameter is carried out after the kaolin clay as a raw material is dispersed in water. By purifying and bleaching the raw material by utilizing water, impurities are removed and the whiteness is enhanced. Further since the particle size is regulated by waterwashing, the kaolin clay has a sharp particle size distribution.

In a resin composition used in the present embodiment, the content of the kaolin clay (E) is preferably 5 to 25% by mass, more preferably 10 to 25% by mass, and still more preferably 10 to 20% by mass. The content is preferably 5% by mass or more from the viewpoint of improving the rigidity of an automotive lamp peripheral part, improving the heat resistance thereof, and improving the fogging property thereof; and the content is preferably 25% by mass or less from the viewpoint of sufficiently holding the surface appearance of the automotive lamp peripheral part.

To the resin composition used in the present embodiment, as required, stabilizers such as an antioxidant, an ultraviolet absorbent and a thermal stabilizer, a colorant, a release agent, and the like may be added.

[Manufacturing Method of the Resin Composition]

A manufacturing method of the resin composition used in the present embodiment includes, for example, a method in which each component described above is melted and kneaded. The condition of melting and kneading the each component in order to manufacture the resin composition is not especially limited, but in the case of using a twin screw extruder, suitably involves melting and kneading under the condition of a cylinder temperature of 270 to 340° C., a screw rotation frequency of 150 to 550 rpm, and a vent vacuum degree of 11.0 to 1.0 kPa, from the viewpoint of obtaining a resin composition capable of sufficiently exhibiting a desired advantage for the present embodiment.

For the manufacturing method of the resin composition used in the present embodiment, use of a twin screw extruder can prepare the resin composition in large amounts and stably.

EXAMPLES

Hereinafter, the present embodiment will be described more specifically by way of Examples and Comparative Examples, but the present embodiment is not limited to these Examples.

Measuring methods of physical properties and raw materials used in Examples and Comparative Examples are as follows.

[Measuring Method of Physical Properties]

1. Heat Distortion Temperature (HDT)

Heat distortion temperatures were measured using 0.64 cm-thick test specimens fabricated from molded articles obtained in Examples 1 to 23 and Comparative Examples 1 to 4 described below, and at a load of 18.6 kg/cm$^2$.

With respect to the evaluation standard, a material exhibiting a higher value of HDT was determined to be more advantageous in the aspect of material design of automotive lamp peripheral parts because the material was better in heat resistance.

2. Molding Flowability (SSP)

Short shot pressures (SSP) when 0.16 cm-thick strip test specimens (with gates at both ends) were obtained from resin compositions obtained in Examples 1 to 12 and Comparative Examples 1 to 3 described below were measured in gauge pressure.

With respect to the evaluation standard, a material exhibiting a lower gauge pressure was determined to be more advantageous in the aspect of material design of automotive lamp peripheral parts because the material was better in molding flowability.

3. Flexural Strength and Flexural Modulus

The flexural strengths and flexural moduli were measured at 23° C. using 0.64 cm-thick test specimens fabricated from molded articles obtained in Examples 1 to 12 and Comparative Examples 1 to 3 described below, according to ASTM D790.

4. Specific Gravity

The specific gravities of resin compositions obtained in Examples 1 to 12 and Comparative Examples 1 to 3 described below were measured using an electronic specific gravimeter SD-200L, made by AlfaMirage Co., Ltd.

5. Fogging Property

Haze values of glass plates after being subjected to a fogging test described below using pellets of resin compositions obtained in Examples 1 to 23 and Comparative Examples 1 to 4 described below and being carried out by an apparatus according to ISO 6452 were measured using a haze meter (model: NDH2000, made by Nippon Denshoku Industries Co., Ltd.).

<Fogging Test>

60 g of pellets of each resin composition obtained in Examples 1 to 23 and Comparative Examples 1 to 4 described below was put in a glass-made sample bottle. A glass plate as a lid was mounted on and covers the mouth of the sample bottle so as to completely cover the mouth of the sample bottle. The sample bottle covered with the glass plate as a lid was heated for 24 hours in an oven whose interior temperature was set at 170° C. By heating, fogging was caused to be generated on the glass plate of the portion of the sample bottle covering the mouth thereof.

Also for 60 g of cut pieces of each molded article obtained in Examples 1, 7, 11, 20, 22 and 23 described below, the haze value of a glass plate after being subjected to the same fogging test as in the above was measured using a haze meter (model: NDH2000, made by Nippon Denshoku Industries Co., Ltd.).

Further for 60 g of pellets of each resin composition obtained in Examples 13 to 23 and Comparative Example 4 described below, the haze value of a glass plate after being subjected to the same fogging test as in the above was measured using a haze meter (model: NDH2000, made by Nippon Denshoku Industries Co., Ltd.), except for setting the interior temperature of the oven at 200° C. Usually, the lower the interior temperature of the oven, the less the fogging of the glass plate and the lower the haze value.

With respect to the evaluation standard, a material exhibiting a lower haze value of the glass plate was determined to be better in the fogging property because generation of fogging due to outgas was less.

6. Hot Rigidity

The measurement of three-point flexural viscoelasticity (measurement condition: a vibration frequency of 10 Hz and a temperature-rise rate of 3° C./sec) was carried out using a 4 mm-thick and 10 mm-wide test specimen fabricated from each molded article obtained in Examples 13 to 23 and Comparative Example 4 described below and by a dynamic viscoelasticity analyzer (EPLEXOR®, made by Gabo Qualimeter Testanlargen GmbH in Germany), to determine a numerical value of the storage elastic modulus E' at 200° C.

With respect to the evaluation standard, a material exhibiting a higher numerical value of the storage elastic modulus E' was determined to be more advantageous in expanding the possibility of application thereof to various types of automotive lamp peripheral parts because the material was better in the hot rigidity.

7. Surface Smoothness (Average Surface Roughness Ra of a Molded Article)

The average surface roughness Ra of the center portion of a flat test specimen of 50 mm×90 mm×2.5 mm thick fabricated using each molded article obtained in Examples 1 to 23 and Comparative Examples 1 to 4 described below was determined using a surface roughness tester (Surftest SJ-400®, made by Mitutoyo Corp.). An average value of numerical values measured in the flowing direction of molten resin in injection molding and in the direction perpendicular to the flow was defined as an average surface roughness.

With respect to the evaluation standard, a material having an average surface roughness of 20 nm or less was determined to be advantageous in expanding the possibility of application thereof to various types of automotive lamp peripheral parts because the material was excellent in the surface smoothness.

8. Aluminum-Deposition Appearance (Determination: Visual Observation)

Aluminum deposition was carried out by a vacuum deposition method on a flat test specimen of 100 mm×100 mm×2 mm thick fabricated using each molded article obtained in Examples 1 to 23 and Comparative Examples 1 and 3 described below. After the aluminum deposition, the test specimen was heated for 24 hours in an oven at 150° C. The luminance feeling of the deposited surface of the test specimen after the heating was visually observed and determined as follows.

Δ: The entire deposited surface was whitish.

○: The entire deposited surface was slightly whitish, but good.

⊚: The entire deposited surface had no whiteness, and was very good.

9. Total Reflectance and Diffusion Reflectance

The test specimen after being subjected to the aluminum deposition in 8 described above was heated for 24 hours in an oven at 150° C. The total reflectance (%) and the diffusion reflectance (%) of the deposited surface of the test specimen after the heating were determined using a reflectometer (HR-100®, made by Murakami Color Research Laboratory Co., Ltd.).

With respect to the evaluation standard, a material having a higher total reflectance and a lower diffusion reflectance was determined to be a material better in the light reflection.

10. Flame Retardancy

The flammability test was carried out using a 1.6 mm-thick test specimen fabricated from each molded article obtained in Examples 19 to 21 described below according to UL-94 test for flammability.

With respect to the evaluation standard, a material exhibiting a shorter burning time was determined to be more advantageous in having higher versatility in regulations including the amount of a flame retardant added according to applications.

[Raw Materials]

<I: Thermoplastic Resin (A)>

(I-1) A poly(2,6-dimethyl-1,4-phenylene)ether having a reduced viscosity (chloroform, 30° C.) of 0.40 dl/g was used (hereinafter, referred to as "I-1").

(I-2) A poly(2,6-dimethyl-1,4-phenylene)ether having a reduced viscosity (chloroform, 30° C.) of 0.30 dl/g was used (hereinafter, referred to as "I-2").

<II: Styrene-Based Resin (B)>

(II-1) A general purpose polystyrene (Styron 660®, made by Dow Chemical Co. in US) was used (Hereinafter, referred to as "II-1"). The general purpose polystyrene was a polystyrene containing no rubber component, that is, a polystyrene reinforced with no rubber.

(II-2) A styrene-acrylonitrile resin prepared as follows was used (hereinafter, referred to as "II-2").

A mixed liquid composed of 4.7 parts by mass of acrylonitrile, 3.3 parts by mass of styrene, 22 parts by mass of ethylbenzene, and 0.02 part by mass of t-butylperoxy-isopropyl carbonate was continuously fed to a 5 L-volume well stirred reactor at a flow rate of 2.5 l/h to be polymerized at 142° C. to thereby obtain a polymerized liquid.

The obtained polymerized liquid was continuously introduced to an extruder with a vent. The unreacted monomers and the solvent were removed from the polymerized liquid under the condition of 260° C. and 40 Torr to obtain a polymer. The polymer was continuously cooled to be solidified, and finely cut to obtain a particulate styrene-acrylonitrile resin.

The styrene-acrylonitrile resin was analyzed for the composition by an infrared absorption spectrometry, and revealed to contain 9% by mass of an acrylonitrile unit and 91% by mass of a styrene unit, and have a melt flow rate of 78 g/10 min (according to ASTM D-1238, measured at 220° C. and a load of 10 kg).

<III: Styrene-Based Thermoplastic Elastomer (C)>

(III-1) Tuftec H10410 (made by Asahi Kasei Chemicals Corp.) was used (hereinafter, referred to as "III-1").

(III-2) A styrene-based thermoplastic elastomer functionalized with a compound having an amino group and prepared as follows was used (hereinafter, referred to as "III-2").

In a reactor with a stirrer whose atmosphere was replaced by a nitrogen gas, cyclohexane was used as a solvent, and n-butyllithium was used as a polymerization initiator. A block copolymer was polymerized which had a number-average molecular weight of 40,000, a polystyrene-polybutadienepolystyrene structure containing 30% by mass of styrene units and 38% of a 1,2-vinyl bond amount of butadiene units based on the total bond amount of the butadiene units, and living lithium ion structures at the polymer terminals. After the completion of the polymerization, 1,3-dimethyl-2-imidazolidinone in an amount of 1.5 times the mol of lithium ions present in the polymer solution originated from the n-butyllithium used was added and reacted at 95° C. for 10 min. A hydrogenation reaction was carried out by a method described in U.S. Pat. No. 4,501,857 to obtain a polymer having a hydrogenation ratio of 81.6% based on the total bond amount of the butadiene units before the reaction. 0.3 g of 2,6-di-tert-butyl-p-crezol as a thermal degradation stabilizer based on 100 g of the polymer was added to the polymer solution after the hydrogenation reaction; and cyclohexane as a solvent was removed under heating. A styrene-based thermoplastic elastomer was thus obtained which had a structure of polystyrene-hydrogenated polybutadiene-polystyrene, and in which secondary amines were added to the polystyrene terminals.

<IV: Alkanesulfonic Acid Metal Salt (D)>

(IV-1) A sodium alkanesulfonate (HOSTAPUR SAS93®, made by Clariant Japan KK) was used (hereinafter, referred to as "IV-1").

(IV-2) A sodium alkanebenzenesulfonate (AKS-518-2®, made by Takemoto Oil & Fat Co., Ltd.) was used (hereinafter, referred to as "IV-2").

<V: Kaolin Clay (E)>

(V-1) A waterwashed kaolin clay not surface treated and having an average primary particle diameter of 0.3 μm (trade name: Polygloss 90®, KaMin LLC in US) was used (hereinafter, referred to as "V-1").

In the present Example, the average primary particle diameter of a kaolin clay was determined as follows: the kaolin clay was dispersed for 10 min in a hexametaphosphoric acid solution by an ultrasonic cleaner; and the obtained dispersion liquid was set on a MicroTrack particle size analyzer (MT-3000II®, made by Nikkiso Co., Ltd.) to determine the particle size distribution, and the central particle diameter D50% of the particle size distribution was defined as an average primary particle diameter.

(V-2) A waterwashed kaolin clay surface treated with a mercaptosilane compound and having an average primary particle diameter of 0.2 μm (trade name: Nucap 290®, made by J. M. Huber Corp. in US) was used (hereinafter, referred to as "V-2").

(V-3) A waterwashed kaolin clay prepared by drying the (V-2) described above for 3 hours in a vacuum drier at 200° C. was used (hereinafter, referred to as "V-3").

The residual volatile contents (weight loss proportions after drying for 3 hours in a vacuum drier at 200° C.) were 1.3% by mass for (V-2) and 0.3% by mass for (V-3).

Comparative Example 1

A high-heat resistant polycarbonate (PC-HT, APEC1800®, made by Bayer Material Science AG) was dried for 3 hours in a 120° C.-hot air drier, and thereafter molded by an injection machine (IS-80C, made by Toshiba Machine Co., Ltd., the cylinder temperature: 330° C., the metal die temperature: 90° C.) to obtain molded articles. The molded articles were measured for each physical property as described above. The measurement results are shown in Table 1 shown below.

Example 1

90 parts by mass of the polyphenylene ether (I-1), 5 parts by mass of the styrene-based resin (II-1) and 5 parts by mass of the styrene-based resin (II-2) were fed to a twin-screw extruder (made by Werner & Pfleiderer Industrial Bakery Technologies, model No.: ZSK25, the number of barrels: 10, having the screw pattern of the screw diameter: 25 mm, L/D=44, kneading discs L: two discs, kneading discs R: six discs, and kneading discs N: two discs) from the most upstream section thereof (top feed), and melted and kneaded at a cylinder temperature of 320° C., at a screw rotation frequency of 250 rpm and at a vent vacuum degree of 7.998 kPa (60 Torr), to thereby obtain pellets of a resin composition.

The obtained pellets of the resin composition were dried for 3 hours in a 120° C.-hot air drier, and thereafter molded by an injection machine (IS-80C, made by Toshiba Machine Co., Ltd., the cylinder temperature: 330° C., the metal die temperature: 90° C.) to obtain molded articles. The molded articles correspond to automotive lamp peripheral parts. The molded articles were measured for each physical property as described above. The measurement results are shown in Table 1 shown below.

Example 2

Pellets of a resin composition were obtained, and molded articles were obtained from the pellets of the resin composition as in Example 1, except for using 80 parts by mass of the polyphenylene ether (I-1) and 20 parts by mass of the styrene-based resin (II-1) as raw materials. The obtained molded articles were measured for each physical property as described above. The measurement results are shown in Table 1 shown below.

Comparative Example 2

Pellets of a resin composition were obtained, and molded articles were obtained from the pellets of the resin composition as in Example 1, except for using 60 parts by mass of the polyphenylene ether (I-1), 20 parts by mass of the styrene-based resin (II-1) and 20 parts by mass of the styrene-based resin (II-2) as raw materials. The obtained molded articles were measured for each physical property as described above. The measurement results are shown in Table 1 shown below.

Comparative Example 3

Pellets of a resin composition were obtained, and molded articles were obtained from the pellets of the resin composition as in Example 1, except for using 60 parts by mass of the polyphenylene ether (I-1), 20 parts by mass of the styrene-based resin (II-1) and 20 parts by mass of a high impact polystyrene being a rubber-reinforced polystyrene (hereinafter, also referred to as "HIPS", PS6200®, Nova Chemicals Corp. in US) as raw materials. The obtained molded articles were measured for each physical property as described above. The measurement results are shown in Table 1 shown below.

Example 3

Pellets of a resin composition were obtained, and molded articles were obtained from the pellets of the resin composition as in Example 1, except for using 80 parts by mass of the polyphenylene ether (I-1), 19 parts by mass of the styrene-based resin (II-1) and 1 part by mass of the styrene-based thermoplastic elastomer (III-1) as raw materials. The obtained molded articles were measured for each physical property as described above. The measurement results are shown in Table 1 shown below.

Example 4

Pellets of a resin composition were obtained, and molded articles were obtained from the pellets of the resin composition as in Example 1, except for using 80 parts by mass of the polyphenylene ether (I-1), 17 parts by mass of the styrene-based resin (II-1) and 3 parts by mass of the styrene-based thermoplastic elastomer (III-1) as raw materials. The obtained molded articles were measured for each physical property as described above. The measurement results are shown in Table 1 shown below.

Example 5

Pellets of a resin composition were obtained, and molded articles were obtained from the pellets of the resin composition as in Example 1, except for using 80 parts by mass of the polyphenylene ether (I-1), 17 parts by mass of the styrene-based resin (II-1) and 3 parts by mass of the styrene-based thermoplastic elastomer (III-2) as raw materials. The obtained molded articles were measured for each physical property as described above. The measurement results are shown in Table 1 shown below.

Example 6

Pellets of a resin composition were obtained, and molded articles were obtained from the pellets of the resin composition as in Example 1, except for using 80 parts by mass of the polyphenylene ether (I-1), 18 parts by mass of the styrene-based resin (II-1) and 2 parts by mass of the alkanesulfonic acid metal salt (IV-1) as raw materials. The obtained molded articles were measured for each physical property as described above. The measurement results are shown in Table 1 shown below.

Example 7

Pellets of a resin composition were obtained, and molded articles were obtained from the pellets of the resin composition as in Example 1, except for using 80 parts by mass of the polyphenylene ether (I-1), 8 parts by mass of the styrene-based resin (II-1), 9 parts by mass of the styrene-based resin (II-2) and 3 parts by mass of the styrene-based thermoplastic elastomer (III-1) as raw materials. The obtained molded articles were measured for each physical property as described above. The measurement results are shown in Table 1 shown below.

Example 8

Pellets of a resin composition were obtained, and molded articles were obtained from the pellets of the resin composition as in Example 1, except for using 80 parts by mass of the polyphenylene ether (I-1), 5 parts by mass of the styrene-based resin (II-1), 12 parts by mass of the styrene-based resin (II-2) and 3 parts by mass of the styrene-based thermoplastic elastomer (III-1) as raw materials. The obtained molded articles were measured for each physical property as described above. The measurement results are shown in Table 1 shown below.

Example 9

Pellets of a resin composition were obtained, and molded articles were obtained from the pellets of the resin composition as in Example 1, except for using 80 parts by mass of the polyphenylene ether (I-1), 17 parts by mass of the styrene-based resin (II-1) and 3 parts by mass of the styrene-based thermoplastic elastomer (III-1) as raw materials. The obtained molded articles were measured for each physical property as described above. The measurement results are shown in Table 1 shown below.

Example 10

Pellets of a resin composition were obtained, and molded articles were obtained from the pellets of the resin composition as in Example 1, except for using 80 parts by mass of the polyphenylene ether (I-1), 8 parts by mass of the styrene-based resin (II-1), 8 parts by mass of the styrene-based resin (II-2), 3 parts by mass of the styrene-based thermoplastic elastomer (III-1) and 1 part by mass of the alkanesulfonic acid metal salt (IV-1) as raw materials. The obtained molded articles were measured for each physical property as described above. The measurement results are shown in Table 1 shown below.

Example 11

Pellets of a resin composition were obtained, and molded articles were obtained from the pellets of the resin composition as in Example 1, except for using 80 parts by mass of the polyphenylene ether (I-1), 7 parts by mass of the styrene-based resin (II-1), 8 parts by mass of the styrene-based resin (II-2), 3 parts by mass of the styrene-based thermoplastic elastomer (III-1) and 2 parts by mass of the alkanesulfonic acid metal salt (IV-1) as raw materials. The obtained molded articles were measured for each physical property as described above. The measurement results are shown in Table 1 shown below.

Example 12

Pellets of a resin composition were obtained, and molded articles were obtained from the pellets of the resin composition as in Example 1, except for using 80 parts by mass of the polyphenylene ether (I-1), 7 parts by mass of the styrene-based resin (II-1), 8 parts by mass of the styrene-based resin (II-2), 3 parts by mass of the styrene-based thermoplastic elastomer (III-1) and 2 parts by mass of the alkanesulfonic acid metal salt (IV-2) as raw materials. The obtained molded articles were measured for each physical property as described above. The measurement results are shown in Table 1 shown below.

Comparative Example 4

Pellets of a resin composition were obtained, and molded articles were obtained from the pellets of the resin composition as in Example 1, except for using 63 parts by mass of the polyphenylene ether (I-1), 7 parts by mass of the styrene-based thermoplastic elastomer (III-2) and 30 parts by mass of the kaolin clay (V-1) as raw materials. Transmission electron microscopic photographs of the obtained molded articles were taken at 10,000 power; and particle diameters of 1,000 or more particles of the kaolin clay were measured by the image analysis from the photographs, and agglomerated particles of 2 μm or larger were observed in 1.4% in the whole. The obtained molded articles were measured for each physical property as described above. The measurement results are shown in Table 2 shown below.

Example 13

Pellets of a resin composition were obtained, and molded articles were obtained from the pellets of the resin composition as in Example 1, except for using 97 parts by mass of the polyphenylene ether (I-1) and 3 parts by mass of the kaolin clay (V-1) as raw materials. The obtained molded articles were measured for each physical property as described above. The measurement results are shown in Table 2 shown below.

Example 14

Pellets of a resin composition were obtained, and molded articles were obtained from the pellets of the resin composition as in Example 1, except for using 100 parts by mass of the polyphenylene ether (I-1) as a raw material. The obtained molded articles were measured for each physical property as described above. The measurement results are shown in Table 2 shown below.

Example 15

Pellets of a resin composition were obtained, and molded articles were obtained from the pellets of the resin composition as in Example 1, except for using 80 parts by mass of the polyphenylene ether (I-1) and 20 parts by mass of the kaolin clay (V-1) as raw materials. The obtained molded articles were measured, as in Comparative Example 4, for the proportion which the kaolin clay agglomerated particles of 2 μm or larger accounted for, and the proportion was 0.6% in the whole. The obtained molded articles were measured for each physical property as described above. The measurement results are shown in Table 2 shown below.

Example 16

Pellets of a resin composition were obtained, and molded articles were obtained from the pellets of the resin composition as in Example 1, except for using 80 parts by mass of the polyphenylene ether (I-1) and 20 parts by mass of the kaolin clay (V-2) as raw materials. The obtained molded articles were examined, as in Comparative Example 4, for the proportion which the kaolin clay agglomerated particles of 2 μm or larger accounted for, and no kaolin clay agglomerated particles of 2 μm or larger were observed at all. The obtained molded articles were measured for each physical property as described above. The measurement results are shown in Table 2 shown below.

Example 17

Pellets of a resin composition were obtained, and molded articles were obtained from the pellets of the resin composition as in Example 1, except for using 75 parts by mass of the polyphenylene ether (I-1), 5 parts by mass of the styrene-based thermoplastic elastomer (III-1) and 20 parts by mass of the kaolin clay (V-2) as raw materials. The obtained molded articles were examined, as in Comparative Example 4, for the proportion which the kaolin clay agglomerated particles of 2 μm or larger accounted for, and no kaolin clay agglomerated particles of 2 μm or larger were observed at all. The obtained molded articles were measured for each physical property as described above. The measurement results are shown in Table 2 shown below.

Example 18

Pellets of a resin composition were obtained, and molded articles were obtained from the pellets of the resin composition as in Example 1, except for using 75 parts by mass of the polyphenylene ether (I-1), 5 parts by mass of the styrene-based thermoplastic elastomer (III-2) and 20 parts by mass of the kaolin clay (V-2) as raw materials. The obtained molded articles were examined, as in Comparative Example 4, for the proportion which the kaolin clay agglomerated particles of 2 μm or larger accounted for, and no kaolin clay agglomerated particles of 2 μm or larger were observed at all. The obtained molded articles were measured for each physical property as described above. The measurement results are shown in Table 2 shown below.

Example 19

Pellets of a resin composition were obtained, and molded articles were obtained from the pellets of the resin composition as in Example 1, except for using 95 parts by mass of the polyphenylene ether (I-1) and 5 parts by mass of the styrene-based thermoplastic elastomer (III-2) as raw materials. The obtained molded articles were measured for each physical property as described above. The measurement results are shown in Table 2 shown below.

Example 20

Pellets of a resin composition were obtained, and molded articles were obtained from the pellets of the resin composition as in Example 1, except for using 83 parts by mass of the polyphenylene ether (I-1), 2 parts by mass of the styrene-based thermoplastic elastomer (III-1) and 15 parts by mass of the kaolin clay (V-2) as raw materials. The obtained molded articles were measured for each physical property as described above. The measurement results are shown in Table 2 shown below.

Example 21

Pellets of a resin composition were obtained, and molded articles were obtained from the pellets of the resin composition as in Example 1, except for using 83 parts by mass of the polyphenylene ether (I-1), 2 parts by mass of the styrene-based thermoplastic elastomer (III-1) and 15 parts by mass of the kaolin clay (V-3) as raw materials. The obtained molded articles were measured for each physical property as described above. The measurement results are shown in Table 2 shown below.

Example 22

Pellets of a resin composition were obtained, and molded articles were obtained from the pellets of the resin composition as in Example 1, except for using 82 parts by mass of the polyphenylene ether (I-1), 5 parts by mass of the styrene-based thermoplastic elastomer (III-2) and 13 parts by mass of the kaolin clay (V-2) as raw materials. The obtained molded articles were measured for each physical property as described above. The measurement results are shown in Table 2 shown below.

Example 23

Pellets of a resin composition were obtained, and molded articles were obtained from the pellets of the resin composition as in Example 1, except for using 82 parts by mass of the polyphenylene ether (I-2), 5 parts by mass of the styrene-based thermoplastic elastomer (III-2) and 13 parts by mass of the kaolin clay (V-2) as raw materials. The obtained molded articles were measured for each physical property as described above. The measurement results are shown in Table 2 shown below.

TABLE 1

| | Com. Ex. 1 | Ex. 1 | Ex. 2 | Com. Ex. 2 | Com. Ex. 3 | Ex. 3 | Ex. 4 | Ex. 5 |
|---|---|---|---|---|---|---|---|---|
| (Formulation) parts by mass | | | | | | | | |
| PC-HT (APEC1800) | 100 | | | | | | | |
| Polyphenylene Ether (I-1) | | 90 | 80 | 60 | 60 | 80 | 80 | 80 |
| Styrene-based Resin (II-1) | | 5 | 20 | 20 | 20 | 19 | 17 | 17 |
| Styrene-based Resin (II-2) | | 5 | | 20 | | | | |
| HIPS (PS6200) | | | | | 20 | | | |
| Styrene-based Thermoplastic Elastomer (III-1) | | | | | | 1 | 3 | |
| Styrene-based Thermoplastic Elastomer (III-2) | | | | | | | | 3 |
| Alkanesulfonic Acid Metal Salt (IV-1) | | | | | | | | |
| Alkanesulfonic Acid Metal Salt (IV-2) | | | | | | | | |
| Sum Total | 100 | 100 | 100 | 100 | 100 | 100 | 100 | 100 |
| (Physical Properties) | | | | | | | | |
| Heat Resistance (HDT) (° C.) | 160 | 172 | 157 | 135 | 130 | 157 | 160 | 162 |
| Molding Flowability (SSP) (kg/cm$^2$) | 85 | 43 | 30 | 11 | 14 | 30 | 31 | 31 |
| Flexural Strength (MPa) | 110 | 122 | 125 | 112 | 105 | 123 | 125 | 129 |
| Flexural Elastic Modulus (MPa) | 2200 | 2480 | 2540 | 2530 | 2380 | 2540 | 2500 | 2550 |
| Specific Gravity | 1.16 | 1.05 | 1.05 | 1.05 | 1.05 | 1.05 | 1.05 | 1.05 |
| 170° C. Fogging Property (sample: pellet, haze value) (%) | 1.6 | 0.2 | 0.7 | 1.8 | 2.6 | 0.6 | 0.4 | 0.4 |
| 170° C. Fogging Property (sample: molded article, haze value) (%) | — | 0.2 | — | — | — | — | — | — |
| Average Surface Roughness of Molded Article (nm) | 8.47 | 4.35 | 8.92 | 3.69 | 40.7 | 8.67 | 8.90 | 4.28 |
| <Aluminum-Deposition Appearance> | | | | | | | | |
| Visual Evaluation* | ○ | ◎ | ○ | — | Δ | ○ | ○ | ◎ |
| Total Reflectance (%) | 88 | 90 | 89 | — | 84 | 89 | 88 | 90 |
| Diffusion Reflectance (%) | 0.8 | 0.7 | 1.1 | — | 3.9 | 1.0 | 1.2 | 0.7 |

| | Ex. 6 | Ex. 7 | Ex. 8 | Ex. 9 | Ex. 10 | Ex. 11 | Ex. 12 |
|---|---|---|---|---|---|---|---|
| (Formulation) parts by mass | | | | | | | |
| PC-HT (APEC1800) | | | | | | | |
| Polyphenylene Ether (I-1) | 80 | 80 | 80 | 80 | 80 | 80 | 80 |
| Styrene-based Resin (II-1) | 18 | 8 | 5 | | 8 | 7 | 7 |
| Styrene-based Resin (II-2) | | 9 | 12 | 17 | 8 | 8 | 8 |
| HIPS (PS6200) | | | | | | | |
| Styrene-based Thermoplastic Elastomer (III-1) | | 3 | 3 | 3 | 3 | 3 | 3 |
| Styrene-based Thermoplastic Elastomer (III-2) | | | | | | | |
| Alkanesulfonic Acid Metal Salt (IV-1) | 2 | | | | 1 | 2 | |
| Alkanesulfonic Acid Metal Salt (IV-2) | | | | | | | 2 |
| Sum Total | 100 | 100 | 100 | 100 | 100 | 100 | 100 |
| (Physical Properties) | | | | | | | |
| Heat Resistance (HDT) (° C.) | 163 | 164 | 165 | 160 | 164 | 163 | 165 |
| Molding Flowability (SSP) (kg/cm$^2$) | 27 | 25 | 24 | 28 | 24 | 26 | 26 |
| Flexural Strength (MPa) | 122 | 125 | 125 | 123 | 125 | 125 | 130 |
| Flexural Elastic Modulus (MPa) | 2560 | 2550 | 2550 | 2550 | 2500 | 2500 | 2740 |
| Specific Gravity | 1.05 | 1.05 | 1.05 | 1.05 | 1.05 | 1.05 | 1.05 |
| 170° C. Fogging Property (sample: pellet, haze value) (%) | 0.9 | 0.2 | 0.2 | 0.2 | 0.2 | 0.3 | 0.1 |
| 170° C. Fogging Property (sample: molded article, haze value) (%) | — | 0.2 | — | — | — | 0.3 | — |
| Average Surface Roughness of Molded Article (nm) | 3.98 | 3.77 | 3.78 | 3.78 | 3.75 | 3.23 | 2.02 |
| <Aluminum-Deposition Appearance> | | | | | | | |
| Visual Evaluation* | ◎ | ◎ | ◎ | ◎ | ◎ | ◎ | ◎ |
| Total Reflectance (%) | 94 | 91 | 91 | 92 | 92 | 94 | 95 |
| Diffusion Reflectance (%) | 0.5 | 0.7 | 0.7 | 0.6 | 0.7 | 0.5 | 0.4 |

*Evaluation of aluminum-deposition appearance: Δ: whitish over the entire deposited surface, ○: good (partially whitish), ◎: very good It was found as indicated in Table 1 that every molded article obtained from the resin compositions of Examples 1 to 12 was better in the balance between the heat resistance (HDT) and the molding flowability (SSP), the rigidity, the light weight and the fogging property, and better in the appearance after the aluminum deposition than the molded article obtained from the resin composition of Comparative Example 1, and was better in the heat resistance and the fogging property than the molded articles obtained from the resin compositions of Comparative Examples 2 and 3. It was also found as indicated in Examples 3, 4 and 5 and Examples 7 to 9 that blending a styrene-based thermoplastic elastomer and a styrene-acrylonitrile resin containing a specific AN % could further improve the fogging property, and additionally, blending a specific styrene-based thermoplastic elastomer, a styrene-acrylonitrile resin containing a specific AN % and an alkanesulfonic acid metal salt could remarkably improve the aluminum-deposition appearance of molded articles. Therefore, it was found that molded articles obtained from the resin compositions of Examples 1 to 12 could suitably be used as automotive lamp parts, particularly automotive lamp extensions and automotive lamp reflectors.

TABLE 2

| | Com. Ex. 4 | Ex. 13 | Ex. 14 | Ex. 15 | Ex. 16 | Ex. 17 | Ex. 18 |
|---|---|---|---|---|---|---|---|
| (Formulation) parts by mass | | | | | | | |
| Polyphenylene Ether (I-1) | 63 | 97 | 100 | 80 | 80 | 75 | 75 |
| Polyphenylene Ether (I-2) | | | | | | | |
| Styrene-based Thermoplastic Elastomer (III-1) | | | | | | 5 | |
| Styrene-based Thermoplastic Elastomer (III-2) | 7 | | | | | | 5 |
| Kaolin Clay (V-1) | 30 | 3 | | 20 | | | |
| Kaolin Clay (V-2) | | | | | 20 | 20 | 20 |
| Kaolin Clay (V-3) | | | | | | | |
| Sum Total | 100 | 100 | 100 | 100 | 100 | 100 | 100 |
| (Physical Properties) | | | | | | | |
| Heat Resistance (HDT) (° C.) | 181 | 191 | 190 | 196 | 196 | 192 | 192 |
| 170° C. Fogging Property (sample: pellet, haze value) (%) | 0.0 | 0.0 | 0.1 | 0.0 | 0.0 | 0.0 | 0.0 |
| 170° C. Fogging Property (sample: molded article, haze value) (%) | — | — | — | — | — | — | — |
| 200° C. Fogging Property (sample: pellet, haze value) (%) | 0.0 | 2.8 | 2.8 | 0.5 | 0.3 | 0.0 | 0.0 |
| Hot Rigidity (GPa) | 3.42 | 1.74 | 1.66 | 3.32 | 3.30 | 2.99 | 3.05 |
| Average Surface Roughness of Molded Article (nm) | 38.8 | 10.5 | 9.88 | 18.4 | 12.2 | 7.24 | 5.26 |
| <Aluminum-Deposition Appearance> | | | | | | | |
| Visual Evaluation* | — | Δ | ○ | Δ | Δ | Δ | ○ |
| Total Reflectance (%) | — | — | 89 | — | — | — | 84 |
| Diffusion Reflectance (%) | — | — | 1.0 | — | — | — | 1.6 |
| <Flame Retardancy 1.6 mm> | | | | | | | |
| average sec | — | — | — | — | — | — | — |
| maximum sec | — | — | — | — | — | — | — |
| determination | — | — | — | — | — | — | — |

| | Ex. 19 | Ex. 20 | Ex. 21 | Ex. 22 | Ex. 23 |
|---|---|---|---|---|---|
| (Formulation) parts by mass | | | | | |
| Polyphenylene Ether (I-1) | 95 | 83 | 83 | 82 | |
| Polyphenylene Ether (I-2) | | | | | 82 |
| Styrene-based Thermoplastic Elastomer (III-1) | | 2 | 2 | | |
| Styrene-based Thermoplastic Elastomer (III-2) | 5 | | | 5 | 5 |
| Kaolin Clay (V-1) | | | | | |
| Kaolin Clay (V-2) | | 15 | | 13 | 13 |
| Kaolin Clay (V-3) | | | 15 | | |
| Sum Total | 100 | 100 | 100 | 100 | 100 |
| (Physical Properties) | | | | | |
| Heat Resistance (HDT) (° C.) | 187 | 191 | 196 | 189 | 189 |
| 170° C. Fogging Property (sample: pellet, haze value) (%) | 0.0 | 0.0 | 0.0 | 0.0 | 0.0 |
| 170° C. Fogging Property (sample: molded article, haze value) (%) | — | 0.0 | — | 0.0 | 0.0 |
| 200° C. Fogging Property (sample: pellet, haze value) (%) | 2.3 | 0.2 | 0.0 | 0.1 | 0.0 |
| Hot Rigidity (GPa) | 1.40 | 2.52 | 2.60 | 2.04 | 2.37 |
| Average Surface Roughness of Molded Article (nm) | 4.82 | 4.94 | 4.81 | 3.21 | 2.20 |
| <Aluminum-Deposition Appearance> | | | | | |
| Visual Evaluation* | ◎ | Δ-○ | ○ | ◎ | ◎ |
| Total Reflectance (%) | 92 | 84 | 84 | 90 | 92 |
| Diffusion Reflectance (%) | 0.6 | 1.9 | 1.7 | 0.8 | 0.6 |
| <Flame Retardancy 1.6 mm> | | | | | |
| average sec | 8 | 21 | 7 | — | — |
| maximum sec | 24 | 52 | 17 | — | — |
| determination | V-1 | HB | V-1 | — | — |

*Evaluation of aluminum-deposition appearance: Δ: whitish over the entire deposited surface, ○: good (partially whitish), ◎: very good It was found as indicated in Table 2 that every molded article obtained form the resin compositions of Examples 13 to 23 was excellent in the heat resistance and the surface smoothness (average surface roughness) of the molded articles, and particularly blending a kaolin clay used in the present embodiment could provide an excellent heat resistance (HDT) and further a much improved fogging property. Therefore, it was found that molded articles obtained from the resin compositions of Examples 13 to 23 could suitably be used as automotive lamp peripheral parts, particularly automotive lamp lens holders and automotive lamp reflectors.

The present patent application is based on the Japanese Patent Application (Japanese Patent Application No. 2009-123731) filed on May 22, 2009, the Japanese Patent Application (Japanese Patent Application No. 2009-123734) filed on May 22, 2009, the Japanese Patent Application (Japanese Patent Application No. 2009-225247) filed on Sep. 29, 2009, and the Japanese Patent Application (Japanese Patent Application No. 2009-225253) filed on Sep. 29, 2009, the subjects of which are incorporated herein by reference.

INDUSTRIAL APPLICABILITY

Since the automotive lamp peripheral parts according to the present invention have high heat resistance and rigidity, and further an excellent fogging property and the like, these can effectively be used particularly as automotive lamp lens holders, automotive lamp extensions, and automotive lamp reflectors.

The invention claimed is:

1. An automotive lamp peripheral part,
being obtained from a resin composition comprising:
70 to 99% by mass of a polyphenylene ether (A), and
1 to 30% by mass of a styrene-based resin (B), wherein the styrene-based resin (B) comprises a styrene-acrylonitrile resin comprising a random copolymer formed from styrene and acrylonitrile monomers and 5 to 15% by mass of acrylonitrile; and
having a haze value of a glass plate of 1.0% or less after the glass plate is subjected to the following fogging test using an apparatus according to ISO 6452:
<fogging test>
60 g of a pellet or a molded article obtained from the resin composition is put in a glass-made sample bottle; the sample bottle is covered with a glass plate as a lid, and heated at 170° C. for 24 hours to thereby generate fogging on the glass plate.

2. The automotive lamp peripheral part according to claim 1, wherein the styrene-acrylonitrile resin comprises 40% to 70% by mass of the styrene-based resin (B).

3. The automotive lamp peripheral part according to claim 1, wherein the resin composition further comprises 0.1 to 10% by mass of a styrene-based thermoplastic elastomer (C).

4. The automotive lamp peripheral part according to claim 3, wherein the styrene-based thermoplastic elastomer (C) is a styrene-based thermoplastic elastomer functionalized with a compound having an amino group.

5. The automotive lamp peripheral part according to claim 1, wherein the resin composition further comprises 0.1 to 7% by mass of an alkanesulfonic acid metal salt (D).

6. The automotive lamp peripheral part according to claim 1, wherein the resin composition further comprises 5 to 25% by mass of a kaolin clay (E); and
the kaolin clay (E) has an average primary particle diameter of 0.01 to 1.0 μm.

7. The automotive lamp peripheral part according to claim 6, wherein the kaolin clay (E) has an average primary particle diameter of 0.01 to 0.5 μm.

8. The automotive lamp peripheral part according to claim 6, wherein a proportion of the number of agglomerated particles of the kaolin clay (E) having a particle diameter of 2 μm or more accounts for less than 1%.

9. The automotive lamp peripheral part according to claim 6, wherein the kaolin clay (E) is a waterwashed kaolin clay.

10. The automotive lamp peripheral part according to claim 6, wherein the kaolin clay (E) is a kaolin clay dried by using a drier.

11. The automotive lamp peripheral part according to claim 6, wherein the kaolin clay (E) is a kaolin clay dried by using a vacuum drier heated at an interior temperature thereof of 150 to 200° C.

12. The automotive lamp peripheral part according to claim 6, wherein the kaolin clay (E) has a residual volatile content of 0.5% by mass or less, wherein the residual volatile content is determined as a weight loss proportion after drying at 200° C. for 3 hours with a vacuum drier.

13. The automotive lamp peripheral part according to claim 6, wherein the kaolin clay (E) is a kaolin clay surface treated with a silane compound.

14. The automotive lamp peripheral part according to claim 6, wherein the kaolin clay (E) is a kaolin clay surface treated with a sulfur-based silane compound.

15. The automotive lamp peripheral part according to claim 1, wherein the polyphenylene ether (A) has a reduced viscosity of 0.25 to 0.43 dL/g, wherein the reduced viscosity is measured at 30° C. using a chloroform solvent.

16. The automotive lamp peripheral part according to claim 1, wherein an aluminum-deposited specular portion has a total reflectance of 85% or more; and the aluminum-deposited specular portion has a diffusion reflectance of 3.0% or less.

17. The automotive lamp peripheral part according to claim 1, wherein the automotive lamp peripheral part is an automotive lamp lens holder.

18. The automotive lamp peripheral part according to claim 1, wherein the automotive lamp peripheral part is an automotive lamp extension.

* * * * *